United States Patent [19]

Tucker et al.

[11] Patent Number: 5,715,880
[45] Date of Patent: Feb. 10, 1998

[54] ROUTER TABLE TOP

[76] Inventors: Edwin C. Tucker, 46 Marielle Court, Ottawa, Ontario, Canada, K2B 8P1; Lloyd Sevack, 29 Cramer Drive, Nepean, Ontario, Canada, K2H 5X2; Leonard G. Lee, 517 Westminster Avenue, Ottawa, Ontario, Canada, K2A 2T9

[21] Appl. No.: 612,127

[22] Filed: Mar. 7, 1996

[51] Int. Cl.$^6$ ...................................................... B27C 9/02
[52] U.S. Cl. .................. 144/286.1; 144/134.1; 144/135.2; 144/286.5
[58] Field of Search .................... 409/179, 180, 409/181, 182, 228, 229; 144/134.1, 1.1, 135.2, 136.95, 154.5, 371, 286.1, 286.5; 83/574

[56] References Cited

U.S. PATENT DOCUMENTS

| | | | |
|---|---|---|---|
| 4,335,765 | 6/1982 | Murphy | 144/286.1 |
| 4,679,606 | 7/1987 | Bassett | 144/135.2 |
| 4,733,704 | 3/1988 | Wolff | 144/286.1 |
| 5,025,841 | 6/1991 | Totten | 144/135.2 |
| 5,289,861 | 3/1994 | Hednick | 144/135.2 |
| 5,398,740 | 3/1995 | Miller | 144/286.1 |

OTHER PUBLICATIONS

CMT Tools Catalog 18, 1995–96, p. 44.
Highland Hardware Early Fall 1993 Sale Catalog, pp. 46–48.
Lee Valley Catalog entitled *Fine Woodworking Tools* 1991–92, p. 108.
McFeely's Square Drive Screws Catalog, ©1995 McFeely's, pp. 60–61.
The Woodworkers' Store® 1993–94 Catalog #C–93, pp. 99–100.
Trend–lines® Woodworkers Warehouse™ Catalog 508H, ©1993 Trend–Lines, Inc., pp. 10,42.
Woodcraft® Jan. 1996 Catalog, p. 74.
Woodhaven Catalog entitled *Uncommon Woodworking Tools*, ©1995, Woodhaven, Inc., pp. 3, 5, 10–13.
Woodworker's Supply, Inc., Catalog #76, Aug. 1992, p. 36.

*Primary Examiner*—W. Donald Bray
*Attorney, Agent, or Firm*—Kilpatrick Stockton LLP; John S. Pratt

[57] ABSTRACT

A router table assembly utilizing a steel plate table top penetrated by a stepped opening having slightly non-concentric round holes. A table top insert is received in the stepped opening, which insert is a round plastic disk having a ledge formed by a disk portion of smaller diameter which matches the smaller hole in the top and which smaller disk portion is slightly offset from the layer diameter portion. The disk is positioned in the top opening and is rotated approximately one-fourth revolution until the cam-like action of the non-concentric portion locks the disk in place. Jaw-like router base clamp mechanisms have plates adjustable to the size and shape of numerous router bases and can be positioned once, after which the router can be removed and remounted in exactly the same position if assured centricity in the table top.

23 Claims, 4 Drawing Sheets

ROUTER TABLE TOP

BACKGROUND OF THE INVENTION

This invention relates to router tables.

Because of their versatility, electric routers are very widely used in woodworking, particularly in home and small commercial shops. Such routers use a powerful electric motor in a housing to which handles are attached for holding and manipulating the tool. The motor shaft terminates in a collet adapted to receive the shank of a router bit or cutter, and a base attaches to the housing and surrounds the cutter so that a portion of the cutter may protrude beyond the base, which bears against a workpiece during use of the router. The position of the base is adjustable up and down parallel to the rotating axis of the collet and cutter, and in plunge routers the relative position of the base and router cutter can change during use of the tool in order to "plunge" the cutter into the workpiece. Electric routers are generally intended to be used by moving the router relative to a stationary workpiece with a portion of the router base bearing against the workpiece.

Substantial additional versatility can be achieved by mounting a router in an inverted position with the router cutter protruding up through an opening in a relatively large flat work surface to provide, in effect, a shaper. With this arrangement a workpiece lying on top of the work surface can be manipulated relative to the stationary router and a rotating router cutter that does not move relative to the workpiece. Such router tables are commercially available in a variety of configurations, and numerous plans for homemade router tables are also available.

A number of problems are associated with existing router tables. For instance, phenolic plates to which the router is attached in some router tables sag from the weight of the router over a period of time. Some existing router table designs do not easily accommodate all of the many routers on the market, or accommodate them with an undesirably large number of holes in the router table top. Each hole in a router table top may catch chips that block or mar a workpiece, and rough hole edges can also damage a workpiece.

Many existing router tables can be used only after the factory-supplied router base is removed, and many existing attachment arrangements make it time consuming to remove and replace a router, require a fence or other accessories to be removed from the router table top to do so and do not facilitate remounting a router in precisely its previous position. It is also frequently difficult to remove and replace cutters with existing router tables.

It is desirable for a router table to accommodate a wide variety of diameters of cutters, but is also often desirable for the table top to fit very closely around a particular cutter during its use. It is also desirable for it to be possible to mount one or more starting or fulcrum pins in the table top, and it is desirable for it to be possible to easily mount and adjust a fence on the table top against which a workpiece can bear and to easily mount other accessories such as a dust chute and workpiece stops, guides, "feather boards" or the like.

It is therefore an object of the present invention to provide a versatile router table top that will not sag over time from the weight of a router suspended from the top. It is an additional object of the present invention to provide a router table top and inserts that are flat and smooth so that the table presents one flat, smooth, rigid work surface.

It is an additional object of the present invention to provide a router table top that does not have numerous holes or slots in the top which might nick a workpiece or otherwise detract from functionality of the top.

It is a further object of the present invention to provide a router table top with inserts that are flush with the table and which easily lock in position. It is a further object of the present invention to provide inserts that are inexpensive and that may easily be machined to provide "zero" clearance around a router cutter.

It is an additional object of the present invention to provide a router table top: (1) on which accessories may be used that are mounted by means of permanent magnets, and (2) to which a fence may be easily attached and accurately adjusted.

It is an additional object of the present invention to provide a router table top to which any commercial router may be attached without alteration of the router or removal of its base.

It is another object of the present invention to provide a router table from which a router may be removed and to which it may be returned quickly without dislocation of a fence or other objects mounted on the table top and with accurate repositioning of the router when it is remounted.

It is a further object of the present invention to provide a router table top that provides easy accessibility of the router collet for changing router cutters.

It is a further object of the present invention to provide a router table top with a sufficiently large opening to permit the use of relatively large diameter panel-raising or other cutters.

It is yet a further object of the present invention to provide cam lock inserts for use with a work surface like a router table top of shaper table top having a stepped opening penetrating its surface.

These and other objects of the present invention will be readily understood by those skilled in the art by reference to the following descriptions of the invention, the claims and the accompanying drawings.

BRIEF DESCRIPTION OF THE INVENTION

The router table of the present invention utilizes a thin, flat steel plate as the router table top, preferably manufactured from low carbon steel. A universal clamping mechanism affixed to the underside of the router table top on studs protruding from the top underside uses two clamp base plates with opposed arcuate edges. The studs are received in slots in the clamp base plates so that the plates may be moved toward or away from each other in order to adapt to router bases of differing shapes and diameters. One clamp lever having a short pressure pad on one side and a long pressure pad on the other side of one end can be positioned on each clamp base plate, using the long or short pad against the router base as appropriate for the thickness of that router base. The clamp lever may be located in a variety of positions along an arcuate slot in the clamp base plate by passing a pivot post captured in the arcuate slot through a straight slot in the clamp lever, appropriately adjusting a lever height nut, and then applying cantilevered pressure against the clamp base plate with a tension thumb screw that is threaded through the end of the clamp lever opposite the pressure pads. This arrangement allows a very substantial variety of commercially available routers to be mounted on the underside of the router table top with the original router base plate directly in contact with the underside of the router table top of the present invention. Because that top is thin, little depth of cut is lost, and the factory-supplied router base plate typically need not be removed.

The vise-like action of the opposed clamp base plate arcuate surfaces against the perimeter of a router base, and the ability to fix each clamp base plate in position, makes it possible to remove a router and replace it in exactly the same position.

The router table top of the present invention has a relatively large diameter hole, on the order of 3.75 inches in diameter, below which the router is centered. Table top inserts are locked in position within this hole. The perimeter of the round inserts has an upper circular portion of a particular diameter and a lower circular portion sufficiently smaller in diameter to provide a downward-facing ledge. The smaller diameter portion of the insert is circular but is not concentric with the larger diameter portion; instead, the two are offset by a small amount on the order of approximately 0.015 inch.

Likewise, the bores in the steel router table top are formed with an upper, larger diameter portion and a lower, smaller diameter portion, each of which bore corresponds generally to the respective diameter of the upper and lower portions of the insert. The bores on the steel top likewise are not concentric but are offset by an amount approximately equal to the offset in the inserts. Inserts are locked in position by placing the insert within the bores in the router table top with the respective upper and lower portions of the insert and table top bores concentric. The insert is then rotated relative to the table top so that the cam-like action resulting from the nonconcentricities locks the insert in place. These inserts are useful for any one of a variety of work surfaces, including router or shaper tables.

DETAILED DESCRIPTION OF THE DRAWINGS

Figure 1:
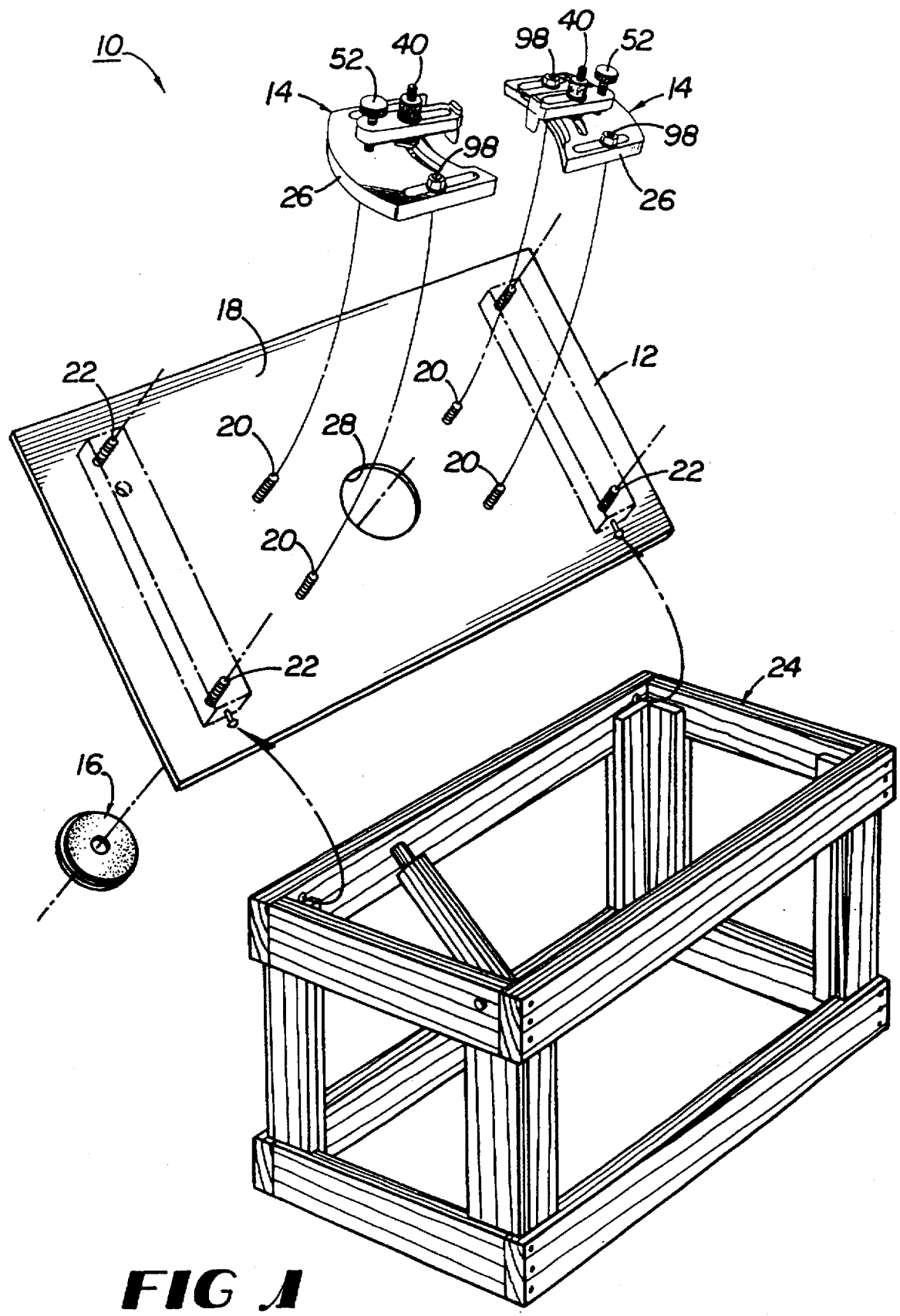
FIG. 1 is an exploded perspective view of the underside of the router table top assembly of the present invention shown with a typical stand.
Figure 2:
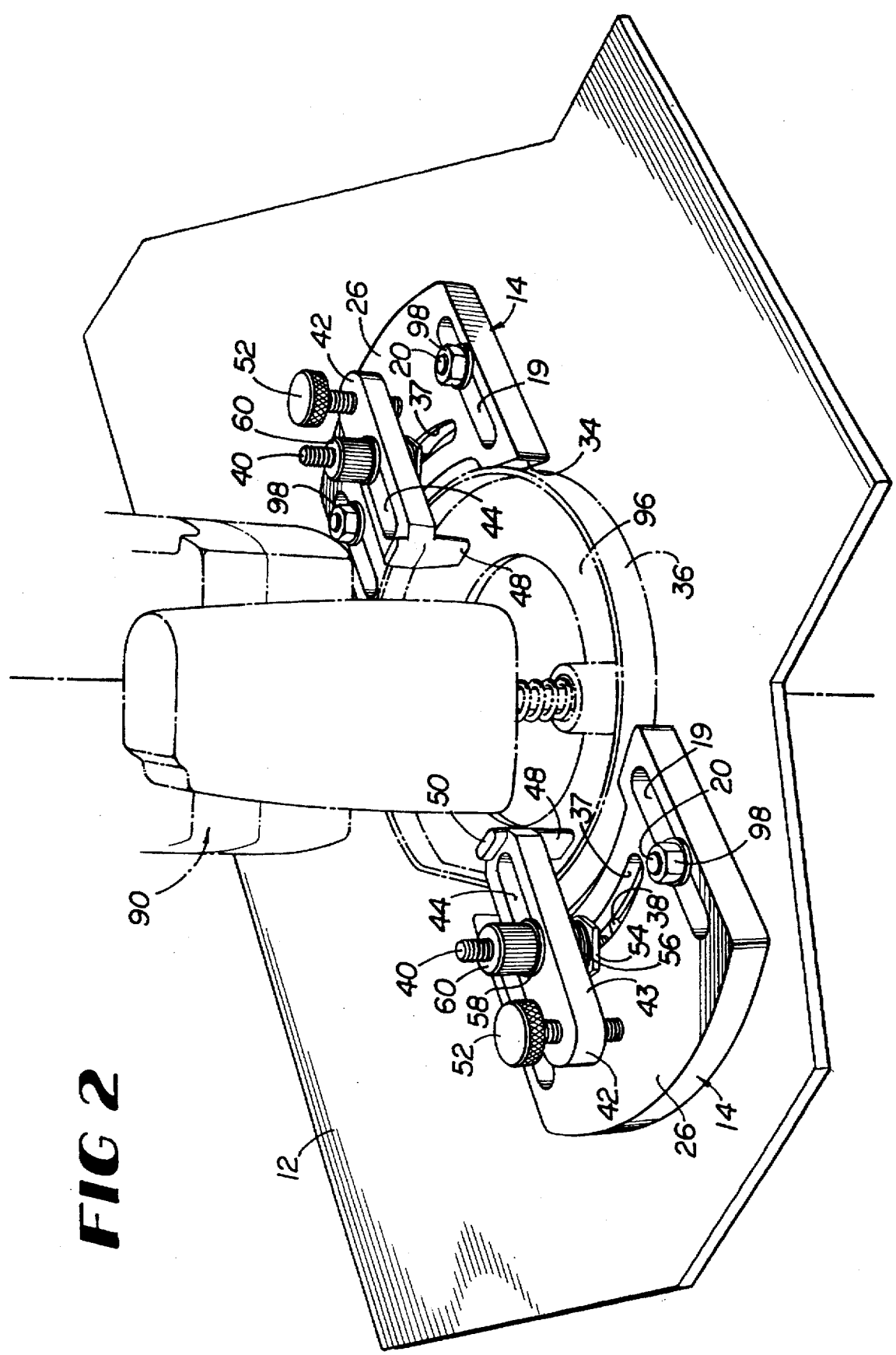
FIG. 2 is a perspective view of a portion of the underside of the router table top assembly of the present invention with a typical router shown in broken lines.

The principal components of the router table top assembly 10 of the present invention are a thin, rigid, flat top 12, two router clamps assembles 14 and an insert 16. Top 12 may be manufactured of low carbon steel approximately 3/16 inch thick. Use of low carbon steel facilitates avoidance of locked-in stresses and distortion due to workloads, aging processes or environmental changes. Care should be taken to ensure that top 12 is flat or slightly convex after a router of nine pounds or less is clamped to and suspended beneath the top. This requires that router (or other) table tops be preconditioned by roller leveling, "hand coining" (a hammering process like the traditional process of "saw doctoring"), or other similar flattening processes. As can be seen by reference to FIG. 1, which shows the underside 18 of top 12, two pairs of studs 20 protrude from the underside 18 of top 12 for fixation of each clamp assembly 14, and four studs 22 also protrude from the underside 18 of top 12 for attachment of spacer bars, wooden cleats, or other means for attaching the table top assembly 10 to a base or positioning it on or within a base 24. All studs are permanently fixed on top 12 with their heads flush to or slightly below the surface of the upper side 30 of top 12.

The structure and use of router clamp assemblies 14 may be understood by reference to FIGS. 2 through 5. Each clamp assembly 14 consists of a clamp base plate 26 that has two parallel slots 19 that receive an adjacent pair of clamp studs 20 so that the clamp assembly 14 may be positioned in a range of locations at different distances from the centrally located hole 28 in top 12.

Figure 3:
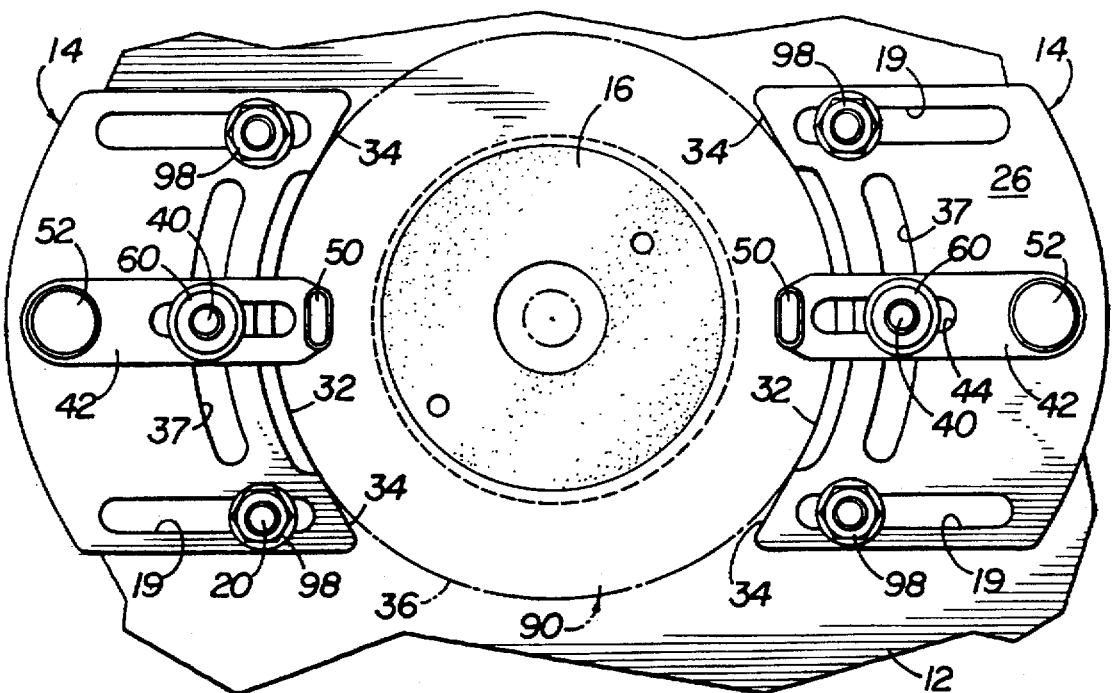
FIG. 3 is a top plan view of the router clamps and table insert of the present invention shown together with a router base indicated in broken lines.

Each clamp base plate 26 has a generally arcuate side 32 facing hole 28 (FIG. 1) and providing two widely separated router base edge contact surfaces 34 for contact with the edge 36 of the router 90 base 96. In use, the two contact surfaces 34 act as a vise-like jaw that opposes the identical vise-like jaw of the opposite clamp base plate 26 contact surfaces 34. FIG. 3 perhaps best shows this vising action.

Each clamp base plate 26 has an arcuate slot 37 in which the head 38 of a threaded pivot post 40 is captured for positioning post 40 at any location along the slot 37.

A reversible clamping lever 42 has a longitudinal straight slot 44 that also receives the pivot post 40. Each clamping lever 42 has a bar or lever arm 43 which is basically a bar 43 penetrated by the longitudinal slot 44 and, at one end, a threaded bore 46 and, at the other end, a long pressure pad 48 extending from one side and a short pressure pad 50 extending from the other side of bar 43. A tension thumb screw 52 is positioned within threaded bore 46.

A pivot post nut 54 is used to secure the pivot post 40 in a particular position in arcuate slot 37, and a pivot post spring 56 located on pivot post 40 between nut 54 and clamping lever 42 bears against bar 43 and urges clamping lever 42 away from clamp base plate 26 and against a washer 58 and thumb nut 60 on the top of pivot post 40.

Any specific embodiment of the invention should balance forces, attachment points and clamp base shape so that use of the clamping system results in negligible table top distortion. To this end, clamp base plate 26 and clamping lever 42 may be manufactured of cast and machined zinc aluminum alloy, of suitably tough plastic materials or may be machined from a wide variety of metals, alloys and plastic materials. Studs 20 and 22 should typically be steel, and post 40, nuts 54 and 60 and thumb screw 52 may be brass, steel or other suitable materials.

FIGS. 6–9 illustrate various configurations of table inserts and the geometry of table top 12 hole 28 that makes it possible to lock inserts in top 12. Fulcrum pin 100 has a threaded end 102 that is received in threaded bore 104 in top 12. A pin (not shown) may be inserted through cross bore 106 to facilitate tightening or loosening pin 100.

Figure 6:
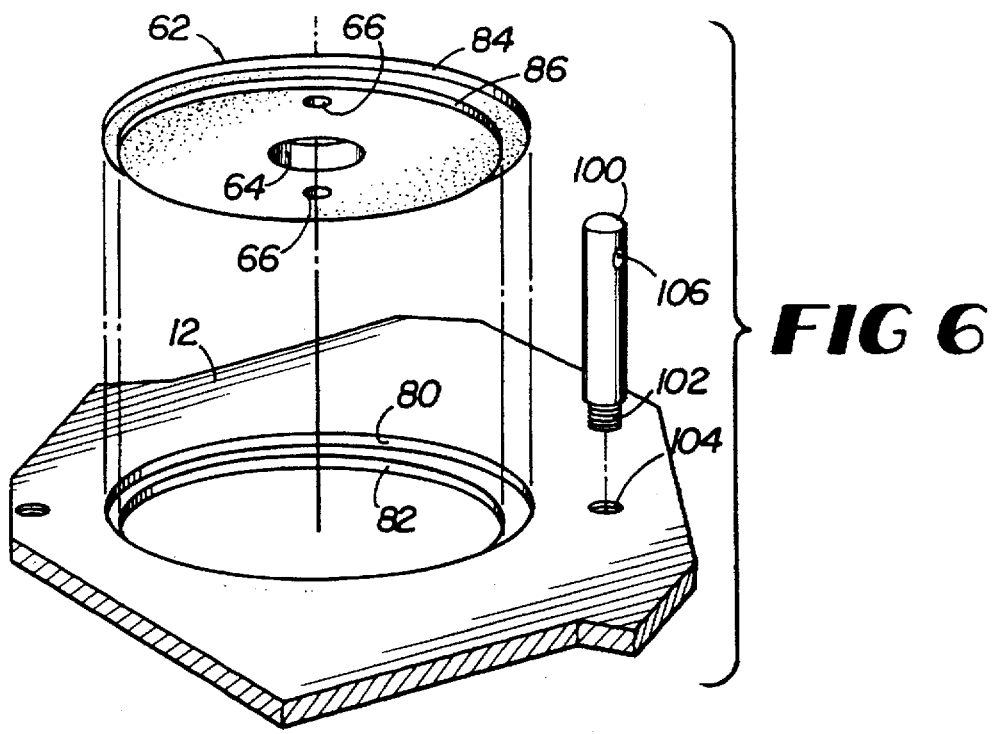
FIG. 6 is an exploded view of a portion of the router table top of the present invention together with a fulcrum pin and table insert.
Figure 7:
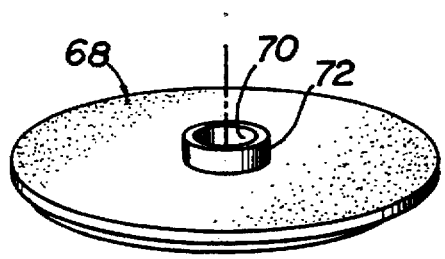
FIG. 7 is a perspective view of the top and edge of an insert of the present invention used as a template bushing.
Figure 8:
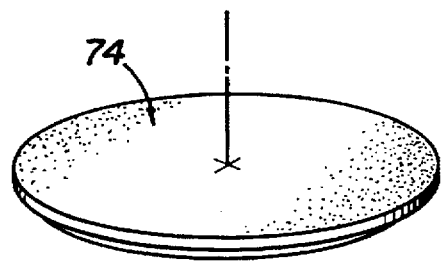
FIG. 8 is a perspective view of the top and edge of a solid insert of the present invention.

FIG. 6 illustrates an insert 62 having a predrilled, centered hole 64 and two pin receiving holes 66 that may be used when installing and removing the insert 62. FIG. 7 shows an insert 68 having a centered hole 70 surrounded by a raised tubular bushing 72 that acts as a guide bushing. Insert 68 is thus usable as a substitute for template bushings sold with or for use with routers. As will be readily appreciated, numerous sizes of bushing 72 can be produced. FIG. 8 shows an unbored or "blank" insert 74 through which a router cutter may be plunged in order to form a "zero-clearance" insert. Finally, FIG. 9 shows a portion of the top 12 penetrated by insert hole 28 and an insert 76 having a relatively large diameter hole 78.

Figure 9:
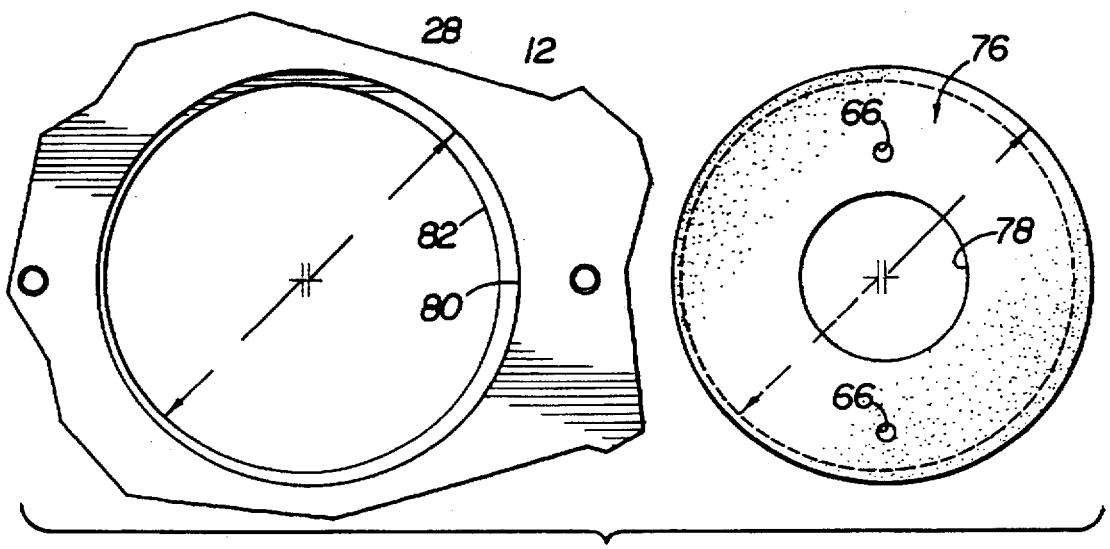
FIG. 9 shows top plan views of a portion of the table top of the present invention surrounding the insert hole and an insert with the nonconcentricity of the hole edges and insert edges exaggerated for clarity.

As may be understood by reference to and comparison of FIGS. 6 and 9, hole 28 in top 12 is defined by two bores. The first is a stopped, larger diameter bore 80 approximately, for example, 3⅞ inches in diameter that penetrates one-half of the thickness of top 12. The second is a smaller diameter bore 82, for example, 3⅝ inches in diameter, that penetrates the portion of top 12 not penetrated by bore 80 and which is offset from bore 80 by, for example, 0.015 inch.

Each insert 16, 62, 68, 74 and 76 is a plastic plate equal to or slightly smaller in thickness than the thickness of top 12. This thickness may, for instance, be approximately 3/16 inch. Each insert has an edge defined by larger and smaller diameter rims 84 and 86. Larger diameter rim 84 is circular and is sized to fit snugly within larger bore 80 in top 12. (Rim 84 may, for instance, be approximately 1/64 inch smaller in diameter than bore 80.) Smaller diameter rim 86 is sized to fit snugly within smaller bore 82 and is offset from concentricity with larger rim 84 by approximately the same small amount as the offset between bores 80 and 82. Thus, for instance, rim 86 may be out of concentricity with rim 84 by approximately 0.015 inch. Premachined hole 64 in insert 62 is centered within larger diameter rim 84. Thus, when insert 62 is positioned within top 12 hole 28, hole 64 in insert 62 will be centered within bore 80. Note that the offset centers combine with the two contact surfaces 34 to create a camming action for holding the insert 62 in place within the top 12.

Figure 4:
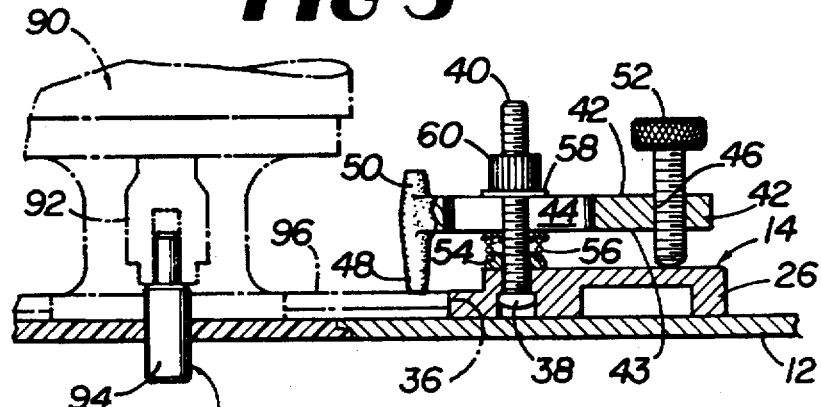
FIG. 4 is a side elevation view of one of the clamps of the present invention shown holding a router having a thin base shown in broken lines in position on the underside of the router table top of the present invention, together with an insert and alignment pin.
Figure 5:
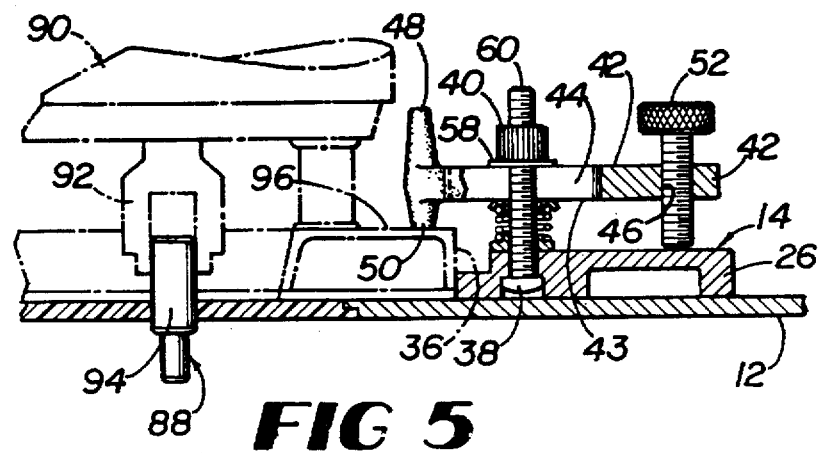
FIG. 5 is a side elevation view similar to FIG. 4 except that the router (shown in broken lines) has a thick base and a larger diameter collet.

Initial mounting of the router and table top assembly 10 may be understood by reference to FIGS. 4 and 5, each of which show table top 12 with underside 18 up.

First, a predrilled insert 62 having a hole 64 centered within rim 84 is installed in hole 28 in top 12. Hole 64 should provide a snug fit for an alignment pin 88. The clamp plate bases 26 are positioned on top 12 spread well apart and with clamping levers 42 well elevated.

The alignment pin 88 is positioned in the router 90 collet 92 with the large diameter end 94 (e.g., ½ inch) that fits snugly in hole 64 protruding from collet 92. Pin 88 is lowered into hole 64 in insert 62. The clamp base plates 24 are then slid toward router 90 base 96 until contact surfaces 34 contact base 96. Then clamp base plates 14 are secured to top 14 by tightening nuts 98 on bolts 20.

Clamp levers 42 are then moved until the appropriate clamp pad 48 or 50 is positioned over a flat, strong portion of router 90 base 96. Then pivot post nut 54 is tightened to secure pivot post 40, and thumb nut 60 is rotated until the clamp pad 48 or 50 contacts router base 96. Finally, thumb screw 52 is tightened so that its end bears against clamp base plate 26 and clamp pad 48 or 50 presses firmly against router base 96.

The "camming" action created by the non-concentric rims 84 and 86 of the inserts 16, 62, 68, 74 and 76 combines with the clamp base plate 26 to allow the user easily and quickly to replace the router in the same first position it originally occupied Thus, the user will have absolute confidence that the router can be removed and replaced at a later time in the exact position it held before removal. This lets the user remove the router in the middle of operating on a workpiece for cleaning, to replace a bit, etc. It can then be replaced in the table without the usual tinkering with the clamp to get it back to its original position.

The inserts 16, 62, 68, 74, 76 may be made of super-high-impact polystyrene, polycarbonate, or other similar plastic, and thickness of the insert should be carefully controlled so that there is in no event any projection of the insert above the top side 30 of the router table top 12. Inserts may be rotated for securing them in position or removal with the heel of one's hand or with a tool having two pins that are received in holes 66. Such a tool (not shown) may be a disk of wood approximately the same diameter as the inserts from which disk pins protrude with appropriate spacing to be received in holes 66.

The router table top assembly of the present invention is not confined to the embodiments described herein but includes variations and modifications within the scope and spirit of the foregoing description, the accompanying drawings and the following claims.

We claim:

1. A router table top assembly comprising:
   (a) a top penetrated by a router cutter opening and having an underside; and
   (b) at least one router mounting device having at least one surface for contact with a router base edge in order to establish the lateral position of the router base when it is mounted on the router table top.

2. The assembly of claim 1, further comprising at least one clamp for clamping a router to the top.

3. The assembly of claim 1, wherein the router mounting device is a clamp base plate having two surfaces for contact with the edge of a router base and wherein the clamp base plate can be secured to the top underside in multiple positions to accommodate router bases of different sizes and shapes.

4. The assembly of claim 3, further comprising a clamp for clamping a router to the underside of the top.

5. The assembly of claim 4, wherein the clamp can be located in multiple positions to accommodate router bases of different sizes and shapes.

6. The assembly of claim 5, wherein the clamp is a lever having two ends, which lever is received on a post, and which post is positionable in multiple locations on the clamp base plate.

7. A router table top assembly comprising;
   (a) a top penetrated by a router cutter opening and having an underside:
   (b) at least one router mounting device comprising a clamp base plate having two surfaces for contact with the edge of a router base in order to establish the lateral position of the router base when it is mounted on the. router table top and wherein the clamp base plate can be secured to the top underside in multiple positions to accommodate router bases of different sizes and shapes: and
   (c) two clamps for clamping a router to the underside of the top, which clamps can be located in multiple positions to accommodate router bases of different sizes and shapes wherein each clamp is a lever having two ends, which lever is received on a post, and which post is positionable in multiple locations on the clamp base plate wherein each of the clamps has a screw threaded through one end of the lever to urge that end away from the clamp base plate and thereby cause the other end of the lever to contact the base of a router.

8. The assembly of claim 7, wherein the lever has a slot in which the post is received.

9. The assembly of claim 8, wherein the lever has two sides and, on the other end of the lever, a short clamping pad on one side and a long clamping pad on the other side.

10. The assembly of claim 6, wherein the top is steel.

11. The assembly of claim 1, wherein the top is steel.

12. A router table top assembly comprising:
(a) a top penetrated by a router cutter opening and having an underside, wherein the cutter opening is a stepped hole having a smaller diameter round through hole and a larger diameter round hole part way through the top, which larger diameter hole is slightly offset from the smaller diameter hole, and further comprising an insert comprising a round disk substantially equal in diameter to the larger diameter hole and having a ledge defined by a round portion of the disk substantially equal in diameter to the smaller diameter hole and slightly offset from the larger diameter disk portion; and
(b) at least one router mounting device having at least one surface for contact with a router base edge.

13. A router table assembly comprising:
a plate penetrated by a stepped hole comprising a smaller diameter round through hole and a larger diameter round hole through the plate, which holes are slightly offset from each other,
a means for mounting a router having a collet so that router cutters fixed in the collet protrude through the stepped hole, and
an insert comprising a round disk substantially equal in diameter to the larger diameter hole and having a ledge defined by a round portion of the disk substantially equal in diameter to the smaller diameter hole and slightly offset from the larger diameter disk portion.

14. The router table assembly of claim 13, wherein the plate is steel and the insert is plastic.

15. The router table assembly of claim 14, wherein the insert is formed from a material selected from the group consisting of polystrene plastic and polycarbonate plastic.

16. A router table assembly comprising a top penetrated by a router cutter opening and having an underside and at least two router clamp assemblies adjacent to the opening, each router clamp assembly comprising:
a clamp base plate positionable in multiple locations on the underside of the top and having two router base edge contact surfaces,
a post positionable in multiple locations on the clamp base plate,
a clamping lever having two ends and two sides, which lever is penetrated by a slot for receiving the post so that the clamping lever is positionable in multiple positions relative to the post and which lever has at one of its ends a short clamping pad on one side and a long clamping pad on the other side, and
a thumb screw for urging the other end of the clamping lever away from the clamp base plate so that one of the clamping pads on the one end of the clamping lever will be urged against a router base.

17. The router table assembly of claim 16, wherein the router cutter opening is a stepped hole having a smaller diameter round through hole and a larger diameter round hole part way through the top, which smaller and larger holes are slightly offset from each other, and
an insert comprising a round disk substantially equal in diameter to the larger diameter hole and having a ledge defined by a round portion of the disk substantially equal in diameter to the smaller diameter hole and slightly offset from the larger diameter disk position.

18. The router table assembly of claim 17, wherein the top is steel and the insert is plastic.

19. The router table assembly of claim 16, wherein the top is steel.

20. The router table assembly of claim 16, wherein the clamp base plates are zinc aluminum alloy.

21. A cam lock insert for use with a work surface penetrated by a stepped opening having a first hole and a second hole, wherein the first and second holes have different diameters and are slightly offset, the insert comprising:
a first disk substantially the same size as the first hole; and
a second disk, coupled to, and offset from the center of, the first disk, substantially the same size as the second hole,
wherein the insert is adapted to be held by the stepped opening.

22. A cam lock insert according to claim 21, wherein the work surface is a router table.

23. A router table having two clamping systems adjustable to hold a router in a first position, each clamping system comprising:
a clamp base plate having two surfaces for contact with the edge of a router base in order to establish the lateral position of the router base when it is mounted on the router table top; and
a lever for releasably holding the router to the underside of the table, the lever comprising a means for biasing one end to contact the router base to hold it in the first position,
wherein the router may be removed from the table and reinstalled in the first position by adjusting the biasing means.

* * * * *